United States Patent [19]

Bauer et al.

[11] Patent Number: 5,620,067
[45] Date of Patent: Apr. 15, 1997

[54] LONGITUDINALLY ADJUSTABLE GAS SPRING WITH DUAL LAYERED CYLINDER

[75] Inventors: Hans-Jürgen Bauer, Altdorf; Walter Böhm, Feucht, both of Germany

[73] Assignee: Suspa Compart Aktiengesellschaft, Altdorf, Germany

[21] Appl. No.: 508,542

[22] Filed: Jul. 28, 1995

[30] Foreign Application Priority Data

Jul. 28, 1994 [DE] Germany .......................... 44 26 846.7
Dec. 17, 1994 [DE] Germany .......................... 44 45 190.3

[51] Int. Cl.⁶ .................. A47C 3/30; F16F 9/02; C23C 8/26
[52] U.S. Cl. ................... 188/322.19; 248/631
[58] Field of Search .......................... 248/631; 297/347, 297/345; 188/322.12, 322.16, 322.19; 267/64.11, 64.12

[56] References Cited

U.S. PATENT DOCUMENTS

| 3,656,593 | 4/1972 | Bauer ..................................... 188/300 |
| 3,711,054 | 1/1973 | Bauer ..................................... 248/562 |
| 3,717,200 | 2/1973 | Pavilon .................................. 165/75 |
| 4,899,969 | 2/1990 | Bauer et al. ......................... 248/161 |
| 4,934,649 | 6/1990 | Stout et al. ......................... 248/551 |
| 4,979,718 | 12/1990 | Bauer et al. ......................... 248/631 |

Primary Examiner—Josie Ballato
Attorney, Agent, or Firm—Browdy and Neimark

[57] ABSTRACT

A longitudinally adjustable gas spring for adjustable-height chairs, tables or the like has an external cylinder, in which a piston is guided for displacement, to which a piston rod is secured, which is guided out of the exterior cylinder. The exterior cylinder has a thin hard external nitrided layer and a considerably softer core layer enclosing the inside wall of the exterior cylinder.

7 Claims, 3 Drawing Sheets

U.S. Patent    Apr. 15, 1997    Sheet 3 of 3    5,620,067
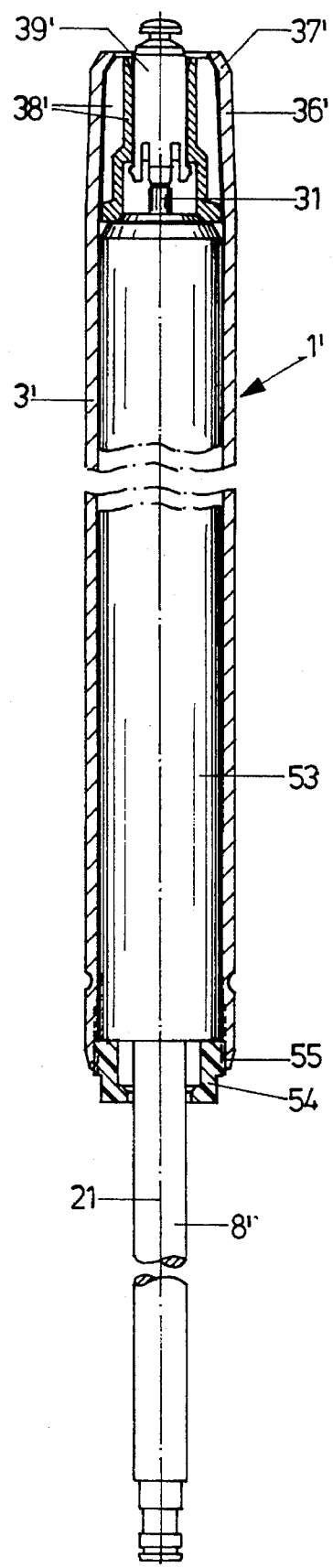
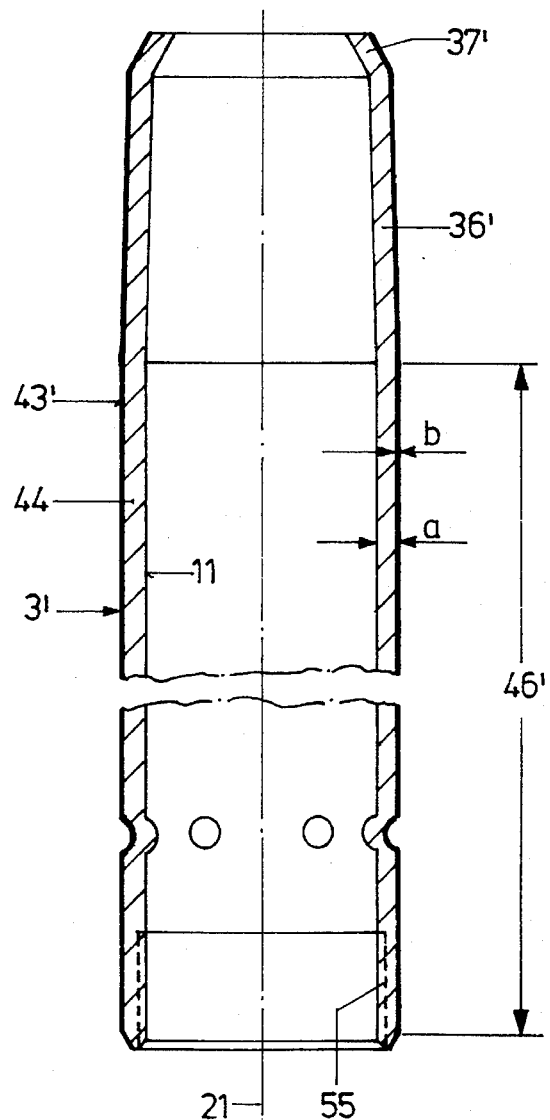

LONGITUDINALLY ADJUSTABLE GAS SPRING WITH DUAL LAYERED CYLINDER

BACKGROUND OF THE INVENTION

1. Field of the Invention

The invention relates to a longitudinally adjustable gas spring for adjustable-height chairs, tables or the like, comprising a housing with a central longitudinal axis, defined by an exterior cylinder having an outside and an inside wall, a piston disposed in the housing for displacement in the direction of the central longitudinal axis, a piston rod disposed concentrically of the central longitudinal axis and secured to the piston and guided out of one end of the exterior cylinder, a valve for effecting a longitudinal adjustment of the gas spring, and a mounting section at the other end of the exterior cylinder.

2. Background Art

Longitudinally adjustable gas springs of the generic type are basically known from U.S. Pat. No. 3,656,593 and they are common practice in adjustable-height chairs. They are applied in such a way that the cylindrical section of the housing is disposed for axial displacement in a guide tube which is fixed to a pedestal of a chair. The outer free end of the piston rod is fixed to the bottom of the guide tube. The end of the housing, i.e. of the exterior cylinder, opposite to the exit of the piston rod is secured to a clamping device arranged on the bottom side of the seat of a chair or a table. Such a configuration of a longitudinally adjustable gas spring as a self-supporting element of a chair column or of a table column is likewise generally known and described for instance in U.S. Pat. No. 3,711,054. The mounting section, to be fixed to the securing device, of the external cylinder of the gas spring may be cylindrical as described in U.S. Pat. No. 3,711,054 or it may be in the form of a clamping cone, so that it simply has to be tightly inserted in a corresponding conical receptacle. This is common practice, too.

When the longitudinally adjustable gas springs of the generic type are used as self-supporting elements in particular in chair columns, the exterior cylinder is subject to reversed bending stresses that are highest where the mounting section passes into the purely cylindrical section, guided in the guide tube, of the exterior cylinder. These reversed bending stresses substantially result from the fact that as a rule, the users of chairs do not take a centered position relative the the central longitudinal axis of the gas spring when sitting on the chair, i.e. they apply considerable bending moments on the exterior cylinder of the gas spring, and that further to this, most users of chairs tend to move permanently while sitting on the chairs. So far, the risk of fracture due to the reversed bending stresses has been countered by the use of exterior cylinders of ever thicker walls and by employing steel grades of ever higher quality for the exterior cylinders. This was accompanied by correspondingly growing costs and still did not satisfy in terms of fatigue strength under reversed bending stresses.

SUMMARY OF THE INVENTION

It is an object of the invention to embody a longitudinally adjustable gas spring of the generic type for use as a self-supporting adjustable-length element in particular in chair columns but possibly also in tables and the like such that the risk of fractures due to reversed bending stresses is further reduced.

According to the invention this object is solved by the exterior cylinder having a thin hard external nitrided layer and a considerably softer core layer enclosing the inside wall. Surprisingly, by reason of the measures according to the invention, according to which the exterior cylinder of the gas spring has a thin hard external nitrided layer produced by nitride hardening only on its outside, the fatigue strength under reversed bending stresses can be increased drastically, while the wall thickness of the exterior cylinder and the quality of the steel used can be reduced. This results in a reduction of weight and costs and in increased safety. When drawn tubes are used for the manufacture of the exterior cylinder, the low degree of surface roughness of the inside wall of the exterior cylinder is maintained so that annular seals slipped along, and then resting on, the inside wall of the exterior cylinder are not damaged during the assembly of the gas springs. As a result of the thin nitrided layer, the nitrided section of the exterior cylinder is loaded by compressive strains, so that when exposed to reversed bending stresses, the core layer representing the substantial volume of the exterior cylinder is subject to reduced tensile stresses; the compressive strains existing are entirely or partially neutralized. There are no hairline cracks which might lead to subsequent fracture. This results substantially from the fact that the nitrided layer itself consists of a hard white layer of a thickness of 4 to 6 µm as an external layer and a diffusion layer adjoining in the direction towards the core layer. The nitrided layer has a thickness of 100 to 200 µm. The white layer is a nitride layer of a chemically reactive iron-nitrogen compound, whereas mixed crystals are formed by nitrogen deposit in the diffusion layer, restricting any displacement of the grid structure. This diffusion layer, too, is very important with a view to the fatigue strength under reversed bending stresses. There is a continuous decrease in hardness from the white layer serving as the external layer to the diffusion layer as far as to the hardness of the base material forming the core layer.

The comparatively high degree of surface roughness of the thin hard external nitrided layer occurring during nitriding can remain in the vicinity of the mounting section, since this improves the mounting effect in a holding device. The purely cylindrical section subsequent to the mounting section is usually polished so as to ensure a low degree of friction towards the guide bush of a guide tube.

The exterior cylinder can be formed by the exterior jacket of the gas spring itself of by an additional protecting tube enclosing the gas spring, as known from U.S. Pat. No. 4,979,718.

Further features, details and advantages of the invention will become apparent from the ensuing description of two examples of embodiment, taken in conjunction with the drawing.

BRIEF DESCRIPTION OF THE DRAWING

FIG. 3 is an illustration, partially cut open, of a longitudinally adjustable gas spring with a separate exterior cylinder, and FIG. 4 is a longitudinal section of the additional exterior cylinder prior to the mounting of the gas spring.

DESCRIPTION OF THE PREFERRED EMBODIMENTS

Figure 1:
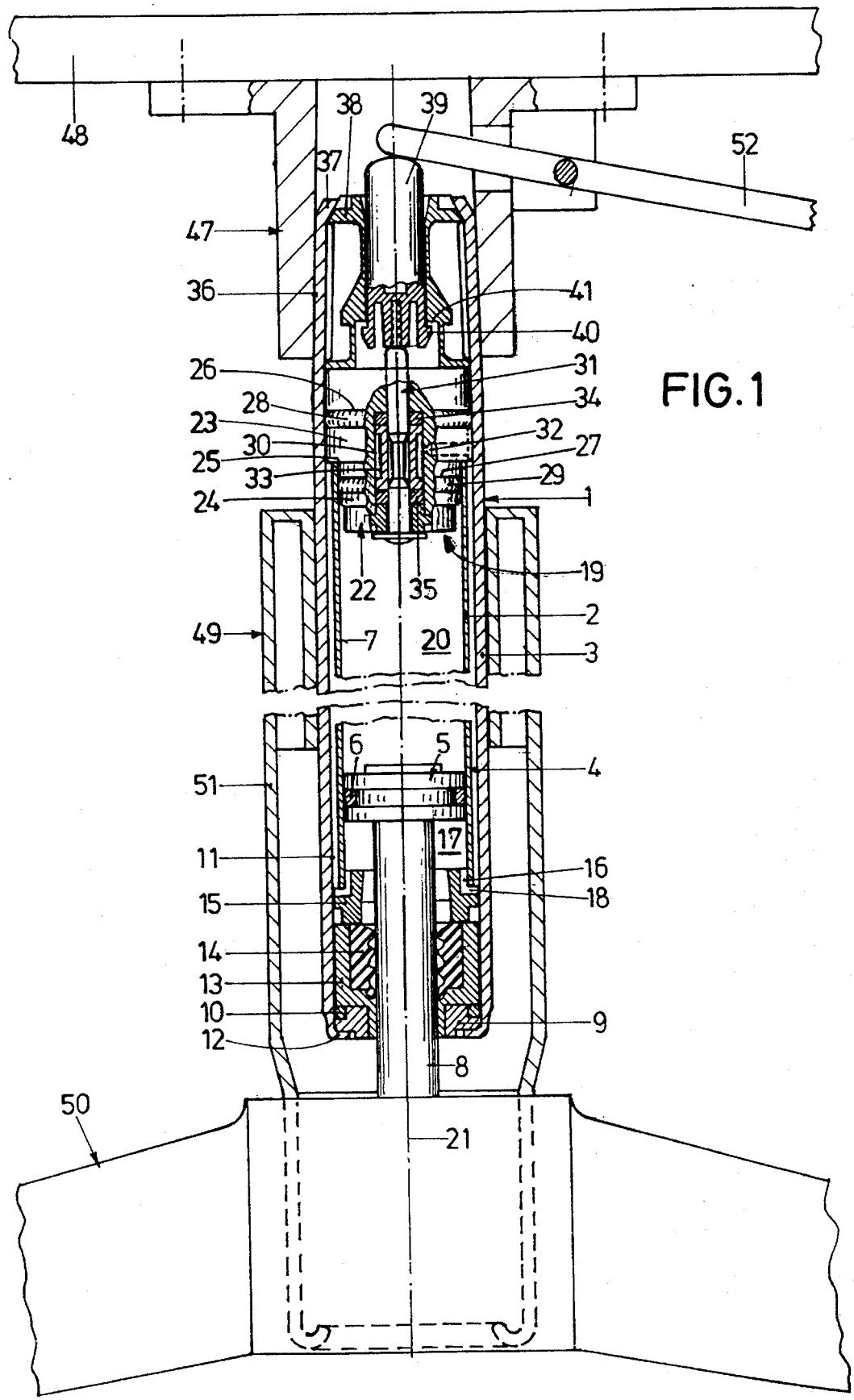
FIG. 1 is a longitudinal section of a longitudinally adjustable gas spring.

The longitudinally adjustable gas spring illustrated in FIG. 1 has a housing 1 substantially comprising two tubes of different diameter one positioned concentrically within the other, namely an interior cylinder 2 and an exterior cylinder 3. An annular space 4 forms between the exterior cylinder 3 and the interior cylinder 2 because of the difference in diameter of the interior cylinder 2 and the exterior cylinder 3.

An approximately annular piston 5 is arranged for axial displacement in the interior cylinder 2 and a sealing washer 6 serves to make the circumference of the piston 5 gastight towards the inside wall 7 of the interior cylinder. The piston 5 is mounted on one end of a piston rod 8 guided coaxially in relation to the housing 1. The piston rod 8 is guided out of one end of the housing 1. This is the end where the housing 1 is closed by a closing ring 9, of which the circumference is sealed gastight towards the inside wall 1 of the exterior cylinder 3 by means of an annular seal 10. Axially externally, the closing ring 9 is retained by the bead 12 of the exterior cylinder 3. On the inside, a cup-shaped sleeve 13 bears against the closing ring 9 and accommodates a multi-lip seal 14, of which the lips rest sealingly on the piston rod 8. Thus, any exit of gas along the surface of the piston rod to the outside is precluded.

From the internal chamber of the housing 1, a centering piece 15 resting on the inside wall 11 of the exterior cylinder 3 supports itself on the sleeve 13; the centering piece 15 is provided with ribs 16 on which the inside wall 7 of the interior cylinder 2 is radially supported, i.e. centered. The interior cylinder 2 is also supported on these ribs 16 to be fixed axially, i.e. arrested in one of two axial directions. Solely ribs 16 being provided for centering and axially supporting the interior cylinder 2, the annular space 4 is connected, in this area, with the housing chamber 17 in the interior cylinder 2, which chamber 17 is defined between the piston 5, the end of the housing 1 where the piston rod exits and the inside wall 7 of the interior cylinder 2. Overflow channels 18 are formed between the ribs 16 for connecting the housing chamber 17 with the annular space 4.

A valve 19 is arranged at the end of the housing 1 opposite to where the piston rod exits; by means of this valve 19, the housing chamber 20 situated in the interior cylinder 2 between the piston 5 and the valve 19 can be connected with or separated from, the annular space 4 and thus the other housing chamber 17.

The entire gas spring including the valve 19 is of a structure substantially symmetrical to the central longitudinal axis 21. The valve 19 has a valve body 22 formed of an external section 23 and an internal section 24. The external section 23 rests on the inside wall 11 of the exterior cylinder 3, whereby the valve body 22 is centered in relation to the exterior cylinder 3. The equally cylindrical section 24 of reduced diameter bears against the inside wall 7 of the interior cylinder 2, whereby the valve body 22 is centered in relation to the interior cylinder 2, such centering also resulting for the interior cylinder 2 in relation to the exterior cylinder 3. In the area of transition from the section 23 to the section 24, a stop collar 25 is formed by means of which the valve body 22 bears against the interior cylinder 2 in the axial direction. In the vicinity of the section 23 on the one hand and the section 24 on the other, annular seals 28, 29 are disposed in corresponding annular grooves 26, 27, by means of which seals 28, 29 a gastight connection is achieved between the section 23 and the inside wall 1 of the exterior cylinder 3 on the one hand and between the internal section 24 and the inside wall 7 of the interior cylinder 2 on the other hand.

In the vicinity of its external section 23, the valve body 22 is provided with a cylindrical coaxial drilled guide hole 30, in which a valve pin 31 is arranged, projecting outwards from the valve body 22. This substantially cylindrical valve pin 31 is guided in the drilled guide hole 30. The valve body 22 has an overflow channel 32 extending radially to the axis 21 and connecting the annular space 4 with the drilled guide hole 30. The valve pin 31 has a necking 33 constantly overlapping the orifice of the overflow channel 32 into the drilled guide hole 30. On either side of the necking 33, annular seals 34, 35 are disposed in the valve body 22 which bear sealingly against the valve pin 31. The annular seal 34 constantly prevents any exit of gas from the valve 19 outwards. With the valve closed, the annular seal 35 seals the housing chamber 20 in relation to the annular space 4 and thus to the housing chamber 17. When the valve pin 31 is pushed in the direction towards the housing chamber 20 into the valve body 22, the necking 33 bypasses the annular seal 35, whereby the housing chamber 20 is connected, via the overflow channel 32, with the the annular space 4 and thus with the other housing chamber 17. This is when longitudinal adjustments of the gas spring is possible. The basic structure and effect of this longitudinally adjustable gas spring at least partially filled with compressed gas is generally known, for instance from U.S. Pat. No. 3,656,593.

The portion of the housing 1 opposite to the exit of the piston rod 8, which is the top portion in the drawing, is provided with a conically tapered mounting section 36, of which the edge 37 is tapered inwards towards the axis 21. Thus, this edge 37 forms a stop for a spacer 38, on which the valve body 22 supports itself in the direction of the axis 21. A slider 39 is slidably guided in the spacer 38 and backs a stop edge 41 facing towards the valve body 22, of the spacer 38 by means of barb-like tongues 40. The slider 39 projects from the exterior cylinder 3. On the other hand, it bears against the valve pin 31. Any actuation of the gas spring from outside will take place by way of the slider 39.

Generally and usually, the longitudinally adjustable gas spring is applied such that the conically tapered mounting section 36 is fixed by cone clamping in a corresponding holding device 47 on the bottom side of the seat 48 of a chair and that for the rest, the housing 1 of the gas spring is disposed in a guide bush 49 of an upright tube 51 united with a pedestal 50, of a chair to be displaceable in the direction of the axis 21 but not displaceable at right angles to the latter. The piston rod 8 is secured on a bottom of such an upright tube 51. An operating lever 52 for the actuation of the slider 39 and thus of the valve 19 is pivotably lodged in the holding device 47. This configuration is general practice.

When such self-supporting gas springs are used in chairs, in which any loads are applied from the seat directly to the exterior cylinder 3 of the gas spring, high reversed bending stresses act upon the exterior cylinder 3. To stand these reversed bending stresses, the exterior cylinder 3—shown prior to the assembly of the gas spring in FIG. 2—has been provided, on its outside 42 only, with a thin hard nitrided layer 43 produced by nitride hardening. Consequently, the exterior cylinder 3 consists of a thin external nitrided layer 43 and a softer core layer 44 which is a lot thicker and extends as far as to the inside wall 11 of the exterior cylinder 3. Usually, the entire wall thickness a of the exterior cylinder 3 ranges from 1.8 to 2.2 mm, it is for instance 2 mm, whereas the thickness b of the thin external nitrided layer 43 ranges from about 100 to 200 µm. This results in the entire wall thickness a of the exterior cylinder 3 exceeding the thickness b of the external nitrided layer 43 by a factor of 10 to 20. The nitrided layer 43 consists of a very thin external layer of about 4 to 6 µm, in which iron nitride of extreme hardness has resulted from the nitration. This extremely hard external layer is followed by a diffusion layer, which is a lot thicker corresponding to the foregoing specifications. This diffusion layer has nitrogen deposited in the iron crystals of the steel, whereby any displacement of the crystals within the grid structure is restricted. This diffusion layer, too, is of considerable importance as regards the fatigue strength under reversed bending stresses. For graphical reasons, the extremely hard external layer and the diffusion layer are not shown separately in the drawing but only as a uniform nitrided layer 43. The conically tapered mounting section 36 and the latter's rim 37 drawn inwards have been integrally molded prior to the nitride hardening. As opposed to this, the opposite tapered edge 45 of the exterior cylinder 3 formed as a bead 12 in the finally assembled gas spring can be beaded even after the nitride hardening of its surface, this portion not being exposed to any reversed bending stresses.

The exterior cylinder 3 is made from a drawn pipe, of which the inside wall 11 has an extremely low degree of surface roughness ranging from 1 to 2 μm (micrometer), which is maintained since the inside wall 11 is not subject to any nitride hardening. As a result, the annular seals 28 are not damaged during the assembly of the gas spring. Consequently, as far as the annular seals 28 are slipped along the inside wall 11 of the exterior cylinder 3 during the assembly, it is important for the inside wall 11 not to be hardened. As a result of the nitride hardening, the outside 42 of the exterior cylinder 3 takes a surface roughness ranging from 2 to 4 μm, which is smoothed by polishing along the purely cylindrical section 46 between the tapered mounting section 36 and the edge 45, resulting in a removal of 0.5 to 1 μm from the hard external layer of an initial thickness of 4 to 6 μm.

The exterior cylinder 3 may consist of a low-grade engineering steel, for instance St 37. By means of the thin hard external nitride layer 43 produced by nitride hardening, the entire exterior cylinder is pre-stressed, the core layer 44 which takes about 90 to 95% of the wall thickness a being under compressive strains. When reversed bending stresses occur, this core layer 44 is relieved and it is not or to a considerably lower degree, subject to tensile stresses as compared with the usually hard chrome-plated outside 42 of the exterior cylinder 3; the compressive strains are only partially canceled, i.e. neutralized. Thus, the risk of reversed bending stress cracks and of corresponding fracture of the external cylinder 3 is efficiently countered. As a result of the nitride hardening only of the outside 42 of the exterior cylinder 3, the latter's fatigue strength under reversed bending stresses is increased by about 50%. This results in that the wall thickness can be reduced by more than 20% and that, as indicated, a commercial low-grade engineering steel can be used instead of the high-quality steel grades used so far, for instance St 52. At the same time, the highest strength grade 4 according to DIN 4551 is attained. The enormous advantages of the smooth inner surface of the drawn pipe used to manufacture the exterior cylinder 3 are maintained. To this end, the exterior cylinder 3 is closed at both ends during the nitride hardening such that the nitriding agent cannot get into the exterior cylinder 3.

The gas spring may also be embodied according to the illustration of FIGS. 3 and 4 where a gas spring of the type shown in FIG. 1 is surrounded by an additional exterior cylinder 3'. In this embodiment, the conically tapering securing section 36' is formed on this additional exterior cylinder 3'. The exterior jacket 53 of the gas spring itself bears against a spacer 38', which is disposed on the securing section 36' amd rests on an edge 37', beaded or necked inwards, respectively, of the exterior cylinder 3'. A slider 39', against which an operating lever 52 can bear, is disposed in the spacer 38'.

The end of the gas spring adjacent to the piston rod 8' is arrested in the exterior cylinder 3' by means of a cup nut 54, which is screwed into a thread 55 at the associated end of the exterior cylinder 3'. This structure of a longitudinally adjustable gas spring, of which the housing 1' is reinforced by an additional exterior cylinder 3', is commercial and known for instance from U.S. Pat. No. 4,979,718. FIGS. 3 and 4 use the same reference numerals for identical parts as FIG. 1, there being no need of a renewed description.

Figure 2:
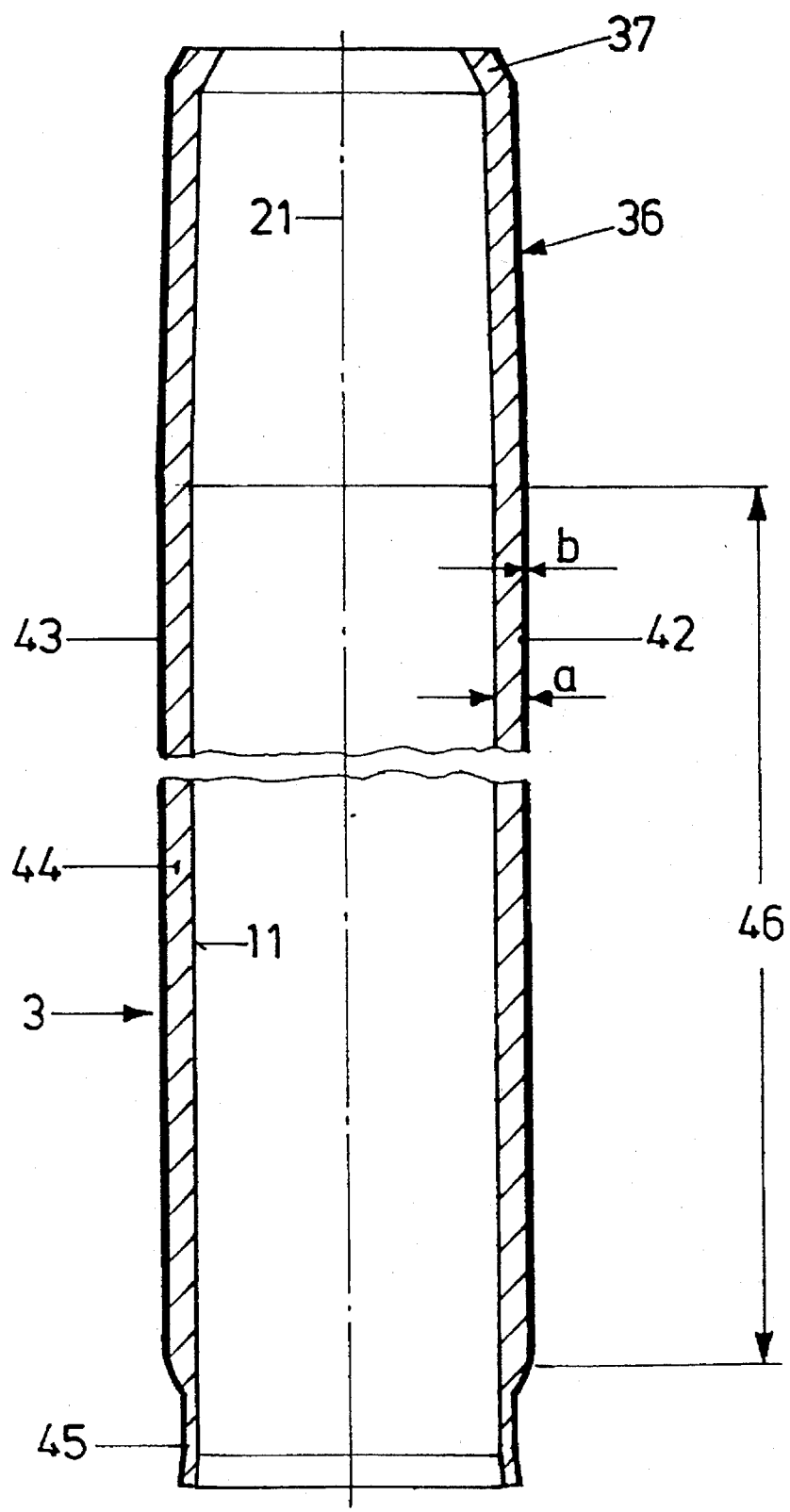
FIG. 2 is a longitudinal section of the exterior cylinder of the gas spring prior to the mounting of the gas spring.

In the same way as in the embodiment according to FIGS. 1 and 2, the exterior cylinder 3' is provided with a thin hard external nitrided layer 43', to which the same diamensional details apply as in the embodiment according to FIGS. 1 and 2, which is why the same reference numerals are used. In this regard, reference is made to the above description. In this case, too, the cylindrical section 46' of the exterior cylinder 3' is polished, which is not necessary for the securing section 36'.

What is claimed is:

1. A longitudinally adjustable gas spring for adjustable-height chairs, tables, comprising
   a housing (1, 1') with a central longitudinal axis (21), defined by an exterior cylinder (3, 3') having an outside (42) and an inside wall (11), and a first end and a second end,
   a piston (5) disposed in the housing (1, 1') for displacement in the direction of the central longitudinal axis (21),
   a piston rod (8, 8') disposed concentrically of the central longitudinal axis (21) and secured to the piston (5) and guided out of said first end of the exterior cylinder (3, 3'),
   a valve (19) for effecting a longitudinal adjustment of the gas spring, and
   a mounting section (36, 36') at said second end of the exterior cylinder (3, 3'),
wherein the exterior cylinder (3, 3') has a thin hard external nitrided layer (43, 43') and a considerably softer core layer (44) enclosing the inside wall (11).

2. A longitudinally adjustable gas spring according to claim 1, wherein the entire wall thickness (a) of the exterior cylinder (3, 3') exceeds the thickness (b) of the external nitrided layer (43, 43') by the factor 10 to 20.

3. A longitudinally adjustable gas spring according to claim 1, wherein the thickness (b) of the external nitrided layer (43, 43') ranges from 100 to 200 μm.

4. A longitudinally adjustable gas spring according to claim 1, wherein the external nitrided layer (43, 43') comprises a very thin, very hard external layer and a much thicker diffusion layer adjoining in the direction towards the core layer (44) and passing into the latter.

5. A longitudinally adjustable gas spring according to claim 4, wherein the hard external layer has a thickness ranging from approximately 4 to 6 μm.

6. A longitudinally adjustable gas spring according to claim 1, wherein the external nitrided layer (43, 43') is polished in the vicinity of a cylindrical section (46, 46') adjoining the mounting section (36, 36').

7. A longitudinally adjustable gas spring according to claim 1, wherein the external nitrided layer (43, 43') is unpolished in the vicinity of the mounting section (36, 36').

* * * * *